US00749555B2

(12) United States Patent  (10) Patent No.: US 7,495,554 B2
Heffner  (45) Date of Patent: Feb. 24, 2009

(54) CLAMSHELL PROTECTIVE ENCASEMENT

(75) Inventor: Kenneth H. Heffner, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 252 days.

(21) Appl. No.: 11/329,737

(22) Filed: Jan. 11, 2006

(65) Prior Publication Data

US 2007/0157682 A1  Jul. 12, 2007

(51) Int. Cl.
*G08B 21/00* (2006.01)
(52) U.S. Cl. .................... 340/540; 340/590; 340/568.1; 340/545.6
(58) Field of Classification Search ............... 340/540, 340/541, 543, 507, 590, 593, 584, 636.1, 340/636.14, 568.1, 571, 545.6; 380/3, 52; 116/85, 87, 101
See application file for complete search history.

(56) References Cited

U.S. PATENT DOCUMENTS

| | | | |
|---|---|---|---|
| 5,353,350 A * | 10/1994 | Unsworth et al. ........... 713/194 |
| 5,568,124 A | 10/1996 | Joyce et al. |
| 5,762,711 A | 6/1998 | Heffner et al. |
| 5,877,093 A | 3/1999 | Heffner et al. |
| 6,110,537 A | 8/2000 | Heffner et al. |
| 6,287,985 B1 | 9/2001 | Heffner et al. |
| 6,438,825 B1 * | 8/2002 | Kuhn ........................... 29/830 |
| 6,853,093 B2 * | 2/2005 | Cohen et al. ................. 257/678 |
| 7,005,733 B2 | 2/2006 | Kömmerling et al. |
| 7,015,823 B1 | 3/2006 | Gillen et al. |
| 7,054,162 B2 * | 5/2006 | Benson et al. ............... 361/760 |
| 7,180,008 B2 * | 2/2007 | Heitmann et al. ........... 174/261 |
| 2002/0199111 A1 | 12/2002 | Clark et al. |
| 2004/0120101 A1 * | 6/2004 | Cohen et al. ................. 361/654 |
| 2006/0087883 A1 * | 4/2006 | Ozguz et al. ........... 365/185.04 |

FOREIGN PATENT DOCUMENTS

| | | |
|---|---|---|
| DE | 10065747 | 12/2000 |
| EP | 0972632 | 1/2000 |

OTHER PUBLICATIONS

Smith et al., "Building a High-Performance, Programmable Secure Coprocessor", Oct. 16, 1998, pp. 1-49, Publisher: IMB Research Division, Published in: Yorktown Heights, NY.
Weingart, "Physical Security for the μabyss System", Proceedings—1987 IEEE Symposium on Security and Privacy., Oakland, CA, 1987, pp. 52-58, Publisher: IEEE.
White et al., "Research Report Introduction to the Citadel Architecture: Security in Physically Exposed Environments", Mar. 21, 1991, pp. 1-57, Publisher: IBM Research Division, Published in: Yorktown Heights, NY.

* cited by examiner

*Primary Examiner*—Toan N Pham
(74) *Attorney, Agent, or Firm*—Fogg & Powers LLC

(57) ABSTRACT

An anti-tamper system is provided. The anti-tamper system comprises a clamshell protective encasement adapted to encapsulate at least one device on a single circuit board such that at least one electrical connector of the single circuit board is accessible. The anti-tamper system also comprises one or more sensors embedded inside the clamshell protective encasement, the one or more sensors being adapted to detect unauthorized attempts to tamper with the clamshell protective encasement.

27 Claims, 1 Drawing Sheet

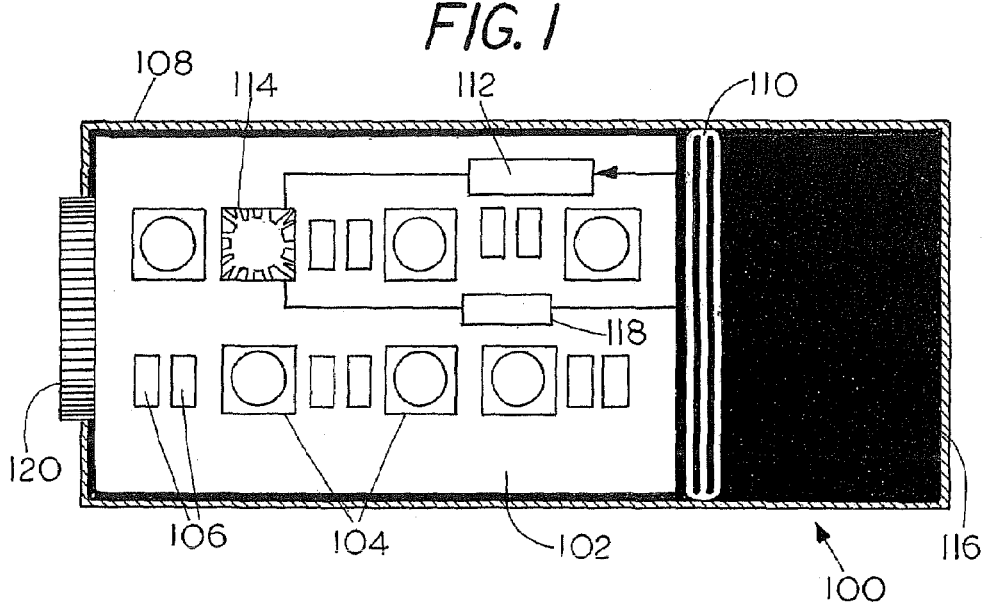
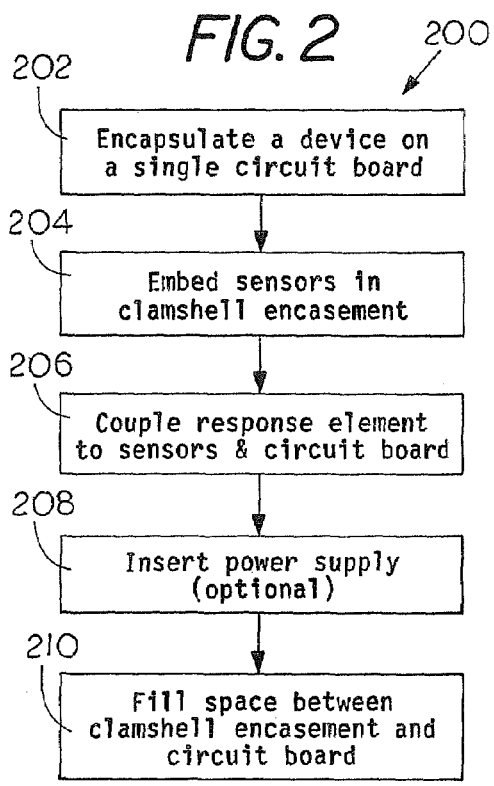
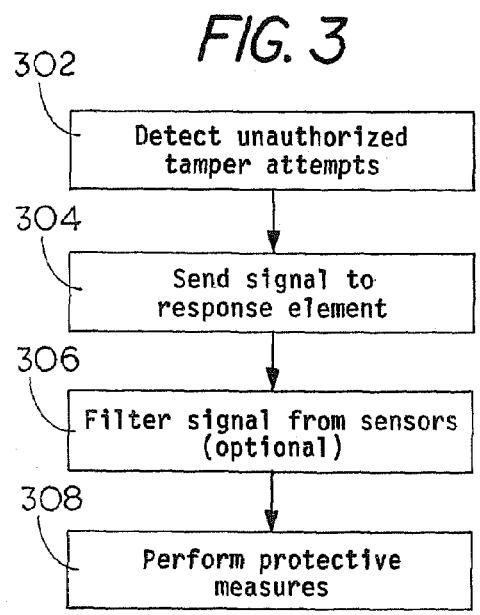

CLAMSHELL PROTECTIVE ENCASEMENT

BACKGROUND

There is a threat to those who develop new technologies that others will reverse engineer their new technologies. The threat puts commercial businesses at risk that their competitors will reverse engineer their products to obtain proprietary technological or embedded information that is critical to maintaining the business's market share. Government systems developers are at risk that enemy nations will use reverse engineering processes on government equipment, and use the stolen technology against them. For both, the economic costs can be substantial and, for governments, such reverse engineering can affect national security.

In order to mitigate the threat of reverse engineering, a layered approach to embedded protection in systems equipment is used to thwart the reverse engineering process. One level of protection is known as outer volume protection. It protects against attacks to the system's chassis (or electronics box) housing the internal assembly, or assemblies, where proprietary technology and information are found. The outer volume protection can include technology to thwart attacks through the input/output ports, Joint Test Action Group (JTAG) ports, and power outlets, etc. Another set of layers of protection include software and components level protection; primarily for the purpose of protecting proprietary code and data. Software protection is typically limited to the use of data encryption, executable inspection programs, hardware keys or dongles. Another level of protection is an intermediate level of protection such as an active barrier architecture that overcomes the weaknesses in the other aforementioned layers of protection.

Unfortunately, no protective measures are perfect. Given enough time and resources, many protective measures can be overcome. In particular, if the outer volume protection is compromised, an unauthorized user has ample opportunities and access to decompile and reverse engineer the actual motherboard and/or other subassemblies and components. Existing protection of the data on subassemblies and components historically has a very low rate of success in stopping reverse engineering of the data. Additionally, some applications do not have full electronic box protection for various reasons. For example, full box protection is often not desired where a single board assembly is sufficient for the system or product. In such situations, it is, presently, a facile reverse engineering process to gain access to subassembly and component features. Therefore, it is even more important to have an effective, intermediate layer of protection for the vulnerable, resident, proprietary data.

For the reasons stated above and for reasons stated below which will become apparent to those of skill in the art upon reading and understanding the present specification, there is a need in the art for an effective means of protecting data on electronic components.

SUMMARY

The above-mentioned problems and other problems are resolved by the present invention and will be understood by reading and studying the following specification.

In one embodiment, an anti-tamper system is provided. The anti-tamper system comprises a clamshell protective encasement adapted to encapsulate at least one device on a single circuit board such that at least one electrical connector of the single circuit board is accessible. The anti-tamper system also comprises one or more sensors embedded inside the clamshell protective encasement, the one or more sensors being adapted to detect unauthorized attempts to tamper with the clamshell protective encasement.

In another embodiment, a method of assembling an anti-tamper system on a circuit board is provided. The method comprises encapsulating at least one device on a single circuit board with a clamshell protective encasement, wherein the clamshell protective encasement is placed such that at least one electrical connector of the single circuit board is accessible. The method also comprises embedding one or more sensors in the clamshell protective encasement for detecting unauthorized attempts to tamper with the clamshell protective encasement.

In yet another embodiment, an anti-tamper system is provided. The anti-tamper system comprises means for encapsulating at least one device on a single circuit board, the encapsulation means being adapted to allow at least one electrical connector of the single circuit board to be accessible, and means for detecting unauthorized attempts to tamper with the encapsulation means.

In yet another embodiment, a method of using an anti-tamper system to protect data on a circuit board is provided. The method comprises detecting unauthorized attempts to tamper with a clamshell protective encasement using one or more sensors, wherein the clamshell protective encasement encapsulates at least one device on a single circuit board while allowing at least one electrical connector of the single circuit board to be accessible. The method also comprises sending a signal to at least one response element when unauthorized attempts are detected by the one or more sensors, and performing protective measures with the at least one response element based on the signal received from the one or more sensors.

DRAWINGS

FIG. 1 is a block diagram of an anti-tamper system according to one embodiment of the present invention.

FIG. 2 is a flow chart showing a method of installing an anti-tamper system on a circuit board according to one embodiment of the present invention.

FIG. 3 is a flow chart showing a method of using an anti-tamper system to protect data on a circuit board according to one embodiment of the present invention.

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention provide additional security to protect data residing on printed circuit boards, such as system subassemblies or multi-chip modules (MCM)). Embodiments of the present invention do not rely on encryption alone to protect such data, but rather limit physical access to the data thus decreasing the possibility of data extraction. The physical access limits placed by embodiments of the present invention are more direct than full electronic box protection by the close proximity of the active physical barrier to the chip die pads, the component leads and the interconnect lines of the subassembly or MCM. In fact, embodiments of the present invention can limit physical access to data on a single board and even on one or more individual components on a single board. By protecting individual boards, embodiments of the present invention significantly decrease the opportunities a reverse engineer has to access and reverse engineer the data on those chips. Embodiments of the present invention are implemented in satellites, aircraft, communications hardware, autonomous surveillance sensors, and any other electronic devices needing protection from reverse engineering.

FIG. 1 is a block diagram of an anti-tamper system 100 according to one embodiment of the present invention. Anti-tamper system 100 includes clamshell protective encasement 108 and sensors 110. Clamshell protective encasement 108 is comprised of a rugged material and designed to be located in close proximity to single circuit board 102. In some embodiments, clamshell protective encasement 108 is comprised of a ceramic-based material. In other embodiments, clamshell protective encasement 108 is comprised of a filled, polymeric composite material.

In FIG. 1, clamshell protective encasement 108 encapsulates circuit board 102. In other embodiments, clamshell protective encasement 108 encapsulates a sub-portion of circuit board 102. Circuit board 102 contains a plurality of devices 104. Devices 104, include, but are not limited to, microprocessors, memory devices, etc. Circuit board 102 also contains electrical connectors 120 and components 106 known to one of skill in the art. For example, components 106 include, but are not limited to, resistors, amplifiers, batteries, capacitors, inductors, etc. Additionally, in some embodiments, electrical connectors 120 are edge connectors. Also embedded inside of clamshell protective encasement are sensors 110. Although only one sensor 110 is shown in FIG. 1, it will be understood by one of skill in the art that in other embodiments a plurality of sensors 110 are used. Sensors 110 are adapted to detect unauthorized attempts to tamper (e.g. remove, open, move, etc.) with clamshell protective encasement 108. In some embodiments, any attempt to tamper with clamshell protective encasement 108 after locking clamshell protective encasement 108 in place is considered an unauthorized attempt. In other embodiments, means are provided to enable a user to enter a key or password and then tamper (e.g. remove, open, move, etc.) with clamshell protective encasement 108 without triggering a response.

Sensors 110 detect unauthorized attempts to tamper with clamshell protective encasement 108 by being sensitive to unusual deformation and repositioning of clamshell protective encasement 108. In some embodiments, sensors 110 are adapted to be sufficiently rugged such that sensors 110 do not respond to or detect stresses felt during normal operation which cause deformation. For example, satellite components undergo extreme stresses during launch which causes deformation and personnel occasionally drop products on a hard surface causing some deformation. It is undesirable for such occurrences to trigger protective measures which render data irretrievable (data, as referred to herein, includes executable code and non-executable data). Therefore, in some embodiments, sensors 110 are adapted to be insensitive to stresses felt during normal operation based on the application of the product utilizing anti-tamper system 100. Additionally, in some embodiments, sensors 110 are strategically placed inside of clamshell protective encasement such that they are robust over a full use temperature range (i.e. −65° C. to 155° C.).

Sensors 110 are adapted to respond quickly to detected tamper attempts. In some embodiments, sensors 110 are comprised of torsional sensors. In other embodiments, sensors 110 are comprised of magnetic sensors. Additionally, in some embodiments, sensors 110 are thin film sensors. In some such embodiments, the thin film sensors are comprised of unpowered piezoelectric type sensors. In other embodiments, sensors 110 are powered by internal power supply 118. In some embodiments, internal power supply 118 is a radioisotope battery. Additionally, in some embodiments power supply 118 is encapsulated within clamshell protective encasement 108, whereas in other embodiments, power supply 118 is accessible outside of clamshell protective encasement 108.

Sensors 110 generate an electrical signal when an unusual deformation of clamshell protective encasement is detected indicating an unauthorized tamper attempt. Sensors 110 are coupled to at least one response element 114 which is adapted to initiate protective measures upon receiving a signal from sensors 110. Although only one device 104 is coupled to response element 114, it will be understood by one of skill in the art that in other embodiments a plurality of devices 104 are coupled to response element 114. In addition, it will be understood by one of skill in the art that in other embodiments a plurality of response elements 114 are used.

In some embodiments response element 114 is a thermal battery for generating sufficient heat to damage the physical components carrying the data to be protected. In other embodiments, response element 114 is a field programmable gate array (FPGA) for performing protective measures, including but not limited to, overwriting data, erasing data, and altering data. Altering data includes combining actual data with false data to confuse potential reverse engineers. Additionally, altering data includes combining actual data with false data such that an original developer of new technology is able to identify products which have been produced as a result of reverse engineering the original developer's technology. In this way, it is known who has reversed engineered the new technology. In other embodiments, other means, such as application specific integrated circuits (ASIC), are used to perform protective measures.

In some embodiments, anti-tamper system 100 also includes actuator 112. Actuator 112 is used, in some embodiments, to amplify a signal from sensors 110 such that the voltage of an electrical signal received by response element 114 is sufficient to trigger response element 114 to respond. In other embodiments, actuator 112 is used to filter signals from sensors 110. In some such embodiments, actuator 112 only allows an electrical signal to be sent to response element 114 when the voltage of an electrical signal has reached a minimum value. In this manner actuator 112 is used to prevent anti-tamper system 100 from responding to stresses felt during normal operation.

When clamshell protective encasement 108 encapsulates a circuit board such as circuit board 102 in FIG. 1, a cavity is formed between clamshell protective encasement 108 and circuit board 102. In some embodiments, this cavity is filled with filler 116 indicated by the darkened black area. Filler 116 provides structural support to circuit board 102 and clamshell protective encasement 108. Additionally, filler 116 is used in some embodiments to provide additional protective measures. For example, filler 116 can be combined with air pockets or bubbles to prevent the use of acoustic imaging of the components encapsulated by clamshell protective encasement 108. Additionally, in some embodiments, filler 116 is a filled, electrically-insulating adhesive. In such embodiments, filler 116 insulates components from electrical shock and makes it more difficult to remove clamshell protective encasement 108 due to the adhesive nature. In some such embodiments, filler 116 is capable of high flow prior to cure.

Clamshell protective encasement 108 differs from a box used for full box protection in that it is designed to be placed in close proximity to and connect physically and electronically to single circuit board 102, whereas full box protection encloses circuit board 102 and other electrical components such as components connected to circuit board 102 via electrical connectors 120 and other circuit boards. Full box protection is not designed to protect individual circuit boards. Hence if the full box protection is compromised, a reverse engineer has access to all the circuitry inside the box. For example, a successful breach of the outer volume protection embedded in the electronics box will provide access to all the interconnect on the internal printed circuit boards. In this manner, the data on the components can be reverse engineered with potentially no evidence of the full box protection being compromised.

Clamshell protective encasement 108, however, is placed in close proximity to and adapted to single circuit board 102 such that at least one device 104 is encapsulated while at least one of electrical connectors 120 is accessible by components connected to circuit board 102. In some embodiments, clamshell protective encasement 108 encapsulates the entire circuit board 102 except for the at least one of electrical connectors 120. In other embodiments, clamshell protective encasement 108 encapsulates a sub-portion of circuit board 102 such that at least one device 104 is encapsulated and a portion of circuit board 102 including the at least one of electrical connectors 120 is accessible. Therefore, embodiments of the present invention provide an additional level of security when full box protection is used and enable protection of single boards in situations where full box protection is not available or desired.

FIG. 2 is a flow chart showing a method 200 of assembling an anti-tamper system on a circuit board according to one embodiment of the present invention. At 202, at least one device on a single circuit board is encapsulated with a clamshell protective encasement such that at least one electrical connector of the single circuit board is accessible. In some embodiments, the entire circuit board except for the at least one electrical connector is encapsulated. In other embodiments, a sub-portion of the circuit board containing the at least one device is encapsulated and a portion of the circuit board including the at least one electrical connector is accessible. At 204, one or more sensors are embedded in the clamshell protective encasement. The one or more sensors are adapted to detect unauthorized attempts to tamper with the clamshell protective encasement as described above. In some embodiments, the one or more sensors are strategically placed such that they are robust over a full temperature range of −65° C.-155° C.

At 206, at least one response element is embedded in the clamshell protective encasement and coupled to the one or more sensors and the circuit board. The at least one response element is adapted to perform protective measures to protect data on the circuit board as described above. In some embodiments, the at least one response element and/or the one or more sensors are powered by an internal power source which is inserted in the clamshell protective encasement at 208. In other embodiments, the at least one response element and the one or more sensors do not need a separate power source. For example, in some embodiments, the one or more sensors are comprised of unpowered piezoelectric type sensors and the response element is comprised of a thermal battery. In such embodiments, an internal power source is not inserted. At 210, a filler is inserted into the cavity formed between the clamshell protective encasement and the circuit board. In some embodiments, the filler provides structural stability to the clamshell protective encasement. In other embodiments, the filler is an electrically insulating adhesive which both makes it more difficult to remove the clamshell protective encasement and insulates the components encapsulated in the clamshell protective encasement.

FIG. 3 is a flow chart showing a method 300 of using an anti-tamper system to protect data on a circuit board according to one embodiment of the present invention. At 302, unauthorized attempts to tamper with a clamshell protective encasement are detected by one or more sensors. The clamshell protective encasement is adapted to encapsulate at least one device on a single circuit board while allowing at least one electrical connector of the circuit board to be accessible. The at least one device and encapsulated portion of the circuit board are essentially inaccessible without tampering (e.g. removing, opening, moving, etc.) with the clamshell protective encasement. In some embodiments, the one or more sensors are magnetic sensors placed along edges of the clamshell protective encasement. In other embodiments, the sensors are torsional sensors.

At 304, the one or more sensors send a signal to at least one response element indicating that an unauthorized attempt to tamper with the clamshell protective encasement has been detected. In some embodiments, the signal indicates a detected tamper attempt with a voltage above a determined voltage value. For example, in some embodiments, the one or more sensors are piezoelectric type sensors which create a voltage over a wire based on deformation of the sensor from unauthorized attempts to tamper with the clamshell protective encasement. Additionally, in some embodiments, means are provided for allowing a user to enter a key or password to disable the sensors such that the user can open, move, etc. the clamshell protective encasement without causing the sensors to trigger a response from a response element.

At 306, in some embodiments, the signal is filtered to prevent a false alarm from causing the response element to perform protective measures. For example, in some embodiments, the signals are filtered to prevent voltage signals below a threshold value from being sent to the at least one response element. In this way, deformation caused as a result of normal operation will not trigger protective measures. In other embodiments, other means preventing false alarms are used. At 308, protective measures are initiated when the at least one response element receives the signal from the one or more sensors. In some embodiments, the protective measures include one of erasing data on the circuit board, overwriting data on the circuit board, and altering data on the circuit board as described above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An anti-tamper system comprising:
 a clamshell protective encasement adapted to encapsulate at least one device on a single circuit board such that at least one electrical connector of the single circuit board is accessible;
 one or more sensors embedded inside the clamshell protective encasement,
the one or more sensors being adapted to detect unauthorized attempts to tamper with the clamshell protective encasement; and
 a thermal battery embedded inside the clamshell protective encasement and coupled to the one or more sensors, wherein the thermal battery is configured to physically destroy components storing critical data in response to signals received from the one or more sensors.

2. The anti-tamper system of claim 1, wherein the clamshell protective encasement farther comprises one of a ceramic-based material and a filled, polymeric composite material.

3. The anti-tamper system of claim 1, wherein the one or more sensors include one or more of a torsional sensor, and a magnetic sensor.

4. The anti-tamper system of claim 1, wherein the clamshell protective encasement is adapted to encapsulate all of the circuit board except the at least one electrical connector.

5. The anti-tamper system of claim 1, wherein the clamshell protective encasement is adapted to encapsulate a sub-portion of the circuit board such that the at least one device is encapsulated but at least a portion of the circuit board in addition to the at least one electrical connector is accessible.

6. The anti-tamper system of claim 5, wherein the clamshell protective encasement is further adapted to encapsulate a sub-portion of the circuit board such that the at least one device is encapsulated but a power source is accessible.

7. The anti-tamper system of claim 1, further comprising:
 an actuator adapted to filter signals from the one or more sensors such that signals from the one or more sensors due to deformation during normal operation stresses do not activate the at least one response element.

8. The anti-tamper system of claim 1, further comprising:
 an internal power source adapted to power the one or more sensors.

9. The anti-tamper system of claim 8, wherein the internal power source is a radioisotope battery.

10. The anti-tamper system of claim 1, wherein the one or more sensors further comprise thin film sensors adapted to be sensitive to unusual deformation.

11. The anti-tamper system of claim 10, wherein the one or more sensors comprise unpowered piezoelectric type sensors.

12. The anti-tamper system of claim 1, further comprising:
 a filler placed between the clamshell protective encasement and the single circuit board.

13. The anti-tamper system of claim 12, wherein the filler is a filled,
 electrically-insulating adhesive.

14. A method of assembling an anti-tamper system on a circuit board, the method comprising:
 encapsulating at least one device on a single circuit board with a clamshell protective encasement, wherein the clamshell protective encasement is placed such that at least one electrical connector of the single circuit board is accessible;
 embedding one or more sensors in the clamshell protective encasement for detecting unauthorized attempts to tamper with the clamshell protective encasement;
 embedding a thermal battery inside the clamshell protective encasement; and
 coupling the thermal battery to the one or more sensors, wherein the thermal battery responds to signals from the one or more sensors by physically destroying components storing critical data on the single circuit board.

15. The method of claim 14, wherein encapsulating a device on a single circuit board further comprises encapsulating the entire circuit board except for the at least one electrical connector.

16. The method of claim 14, wherein encapsulating a device on a single circuit board further comprises encapsulating a sub-portion of the circuit board such that the at least one device is encapsulated and at least a portion of the circuit board in addition to the at least one electrical connector is accessible.

17. The method of claim 14, wherein embedding one or more sensors in the clamshell protective encasement further comprises strategically placing the one or more sensors such that the one or more sensors are robust over a temperature range of −65° C.-155° C.

18. The method of claim 14, further comprising:
 inserting an internal power supply to power the one or more sensors.

19. The method of claim 14, further comprising:
 inserting a filler in a cavity between the clamshell protective encasement and the circuit board.

20. The method of claim 19, wherein inserting a filler further comprises inserting a filled, electrically-insulating adhesive.

21. An anti-tamper system comprising:
 means for encapsulating at least one device on a single circuit board, the encapsulation means being adapted to allow at least one electrical connector of the single circuit board to be accessible; and
 means for detecting unauthorized attempts to tamper with the encapsulation means; and
 means, responsive to the detection means, for generating sufficient heat to damage physical components on the single circuit board which carry data to be protected.

22. The anti-tamper system of claim 21, further comprising:
 means for providing structural stabilization and electrical insulation of the anti-tamper system.

23. The anti-tamper system of claim 21 further comprising:
 means for providing power to the detection means.

24. The anti-tamper system of claim 21 further comprising:
 means for accepting one of a key and a password to allow a user to tamper with the encapsulation means without triggering a response from the means for generating sufficient heat.

25. A method of using an anti-tamper system to protect data on a circuit board, the method comprising:
 detecting unauthorized attempts to tamper with a clamshell protective encasement using one or more sensors, wherein the clamshell protective encasement encapsulates at least one device on a single circuit board while allowing at least one electrical connector of the single circuit board to be accessible;

sending a signal to a thermal battery when unauthorized attempts are detected by the one or more sensors; and generating sufficient heat with the thermal battery to damage physical components on the single circuit board based on the signal received from the one or more sensors.

26. The method of claim 25, farther comprising:

filtering the signal from the one or more sensors to prevent false alarm from triggering a response from the thermal battery.

27. The method of claim 25, wherein sending a signal further comprises: creating a voltage over a wire based on deformation of a piezoelectric type sensor.

\* \* \* \* \*